United States Patent [19]
Schirmer et al.

[11] Patent Number: 5,583,422
[45] Date of Patent: Dec. 10, 1996

[54] SWITCH CONTROLLER SYSTEM

[75] Inventors: Klaus Schirmer, Ingolstadt; Jakob Schillinger, Gaimersheim; Gernot Sikora, Rott/Inn, all of Germany

[73] Assignee: Temic Telefunken microelectronic GmbH, Heilbronn, Germany

[21] Appl. No.: 142,293

[22] PCT Filed: Mar. 19, 1993

[86] PCT No.: PCT/EP93/00674

§ 371 Date: Feb. 10, 1994

§ 102(e) Date: Feb. 10, 1994

[87] PCT Pub. No.: WO93/19514

PCT Pub. Date: Sep. 30, 1993

[30] Foreign Application Priority Data

Mar. 20, 1992 [DE] Germany .................. 42 09 053.9

[51] Int. Cl.⁶ .................................. H02M 3/158
[52] U.S. Cl. .................. 323/224; 323/271; 323/288; 323/299
[58] Field of Search .................. 363/42, 43; 323/222, 323/224, 268, 271, 272, 282, 284, 285, 288, 299

[56] References Cited

U.S. PATENT DOCUMENTS

| | | | |
|---|---|---|---|
| 2,911,605 | 11/1959 | Wales, Jr. | 336/200 |
| 3,238,480 | 3/1966 | Killoran | 336/84 R |
| 4,266,150 | 5/1981 | Bergmann | 307/268 |
| 4,618,812 | 10/1986 | Kawakami | 323/224 |
| 4,675,547 | 6/1987 | Eichenwald | 307/270 |
| 4,742,316 | 5/1988 | Riedger | 332/9 R |
| 4,803,609 | 2/1989 | Gillett et al. | 363/17 |
| 4,873,757 | 10/1989 | Williams | 29/602.1 |
| 4,967,138 | 10/1990 | Obergfell et al. | 323/224 |
| 5,099,183 | 3/1992 | Webe | 318/268 |

FOREIGN PATENT DOCUMENTS

| | | |
|---|---|---|
| 0105869A2 | 4/1984 | European Pat. Off. |
| 1905369 | 8/1970 | Germany. |
| 2260492 | 6/1974 | Germany. |
| 0249270A3 | 5/1987 | Germany. |
| 3608082A1 | 9/1987 | Germany. |
| 3628138A1 | 2/1988 | Germany. |
| 8801879.2 | 4/1988 | Germany. |
| 3914069A1 | 10/1990 | Germany. |
| 56-101222 | 8/1981 | Japan. |

OTHER PUBLICATIONS

U. Tietzen, Ch. Schenk: "Halbleiter–Schaltungstechnik" [Semiconductor Circuit Technology], Berlin 1989, Chapter 18.6, pp. 563–571.
Unitrode: Semiconductor Databook, 1987–1988, pp. 12–6 to 12–11.
Dirk Van Der Linde et al.: Design of a High–Frequency Planar Power Transformer in Multilayer Technology. In: IEEE Transactions on Industrial Electronics, vol. 38, No. 2, Apr. 1991, pp. 135–141.

*Primary Examiner*—Robert Nappi
*Assistant Examiner*—Y. J. Han
*Attorney, Agent, or Firm*—Spencer & Frank

[57] ABSTRACT

The invention relates to a switch controller system which furnishes a constant output voltage over a broad input voltage range. The input voltage may here be lower as well as higher than the output voltage. The large control range is realized by a combination of a down converter and an up converter in a power output stage and a common storage choke. The storage choke is advantageously configured as a flat coil in multi-layer technology and includes a coil core. A novel switch controller system is disclosed which links two known converter concepts having different characteristics with one another.

24 Claims, 10 Drawing Sheets

SWITCH CONTROLLER SYSTEM

BACKGROUND OF THE INVENTION

The invention relates to a switch controller system for converting an input voltage ($U_E$) into an output voltage ($U_A$) including a control amplifier and a pulse width modulator in the control loop as well as a power output stage including a storage choke (L) as the control path Switch controllers are used primarily as direct voltage converters for low to medium power applications. If the input voltage range lies above the output voltage, down converters are employed in the switch controllers. If, on the other hand, the input voltage range is lower than the output voltage, up converters are employed. Such switch controllers are disclosed, for example, by U. Tietzen, Ch. Schenk, in Halbleiterschaltungstechnik [Semiconductor Circuit Technology], Berlin, 1989, Chapter 18.6, pages 563–571. The down converter disclosed there is composed of a series connection of a series switch with a storage choke. The input of the storage choke is connected to ground potential by way of a reverse direction diode. The output voltage is obtained at the output of coil L. A smoothing capacitor determines the ripple of the output voltage. For the up converter, the storage choke receives the input voltage directly. At its output, the storage choke is connected to ground by way of a ground switch. The output voltage $U_A$ is tapped by way of a diode in forward direction. A smoothing capacitor here again takes care of reducing the output ripple. In order to prevent the output voltage from rising if the output currents are low, the ratio of turn-on time to turn-off time for the up converter and the down converter must be adapted accordingly. The generation of the pulse width modulated switching signal is effected by means of two modules: a control amplifier with voltage reference and a pulse width modulator. The pulse width modulator is generally composed of a sawtooth generator and a comparator. The comparator switches the switch on as long as the control voltage is greater than the delta voltage. The control voltage resulting therefrom is a rectangular voltage at a fixed frequency whose keying ratio is a function of the control voltage. Integrated pulse width modulators for switch controllers are known, for example, from Unitrode, Semiconductor Databook, 1987–1988, pages 12-6 to 12-11.

These known switch controllers have the drawback that, depending on whether the input voltage range lies above or below the output voltage, either a down converter or an up converter is employed in the switch controller.

SUMMARY OF THE INVENTION

It is therefore an object of the invention to provide a switch controller system which permits a broad input voltage range from below to above the output voltage and furnishes a constant output voltage over the entire input voltage range.

The above object generally is achieved according to the present invention by a switch controller system for converting an input voltage ($U_E$) into an output voltage ($U_A$) including a control amplifier and a pulse width modulator in the control loop, as well as a power output stage including a storage choke (L) as the control path, wherein the power output stage includes a down converter and an up converter so that an input voltage range from $U_E<U_A$ to $U_E>U_A$ can be fully regulated by the switch controller system. The features of the invention are discussed and disclosed below.

The switch controller system is able to regulate the broad input voltage range from below to above the output voltage because the power output stage includes a down converter and an up converter which are actuated by a control amplifier by way of a pulse width modulator.

Figure 2:
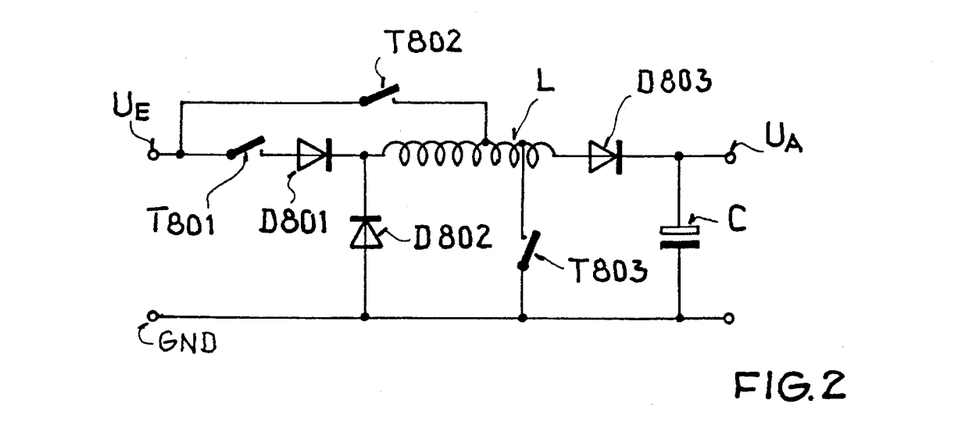
FIG. 2 is a basic circuit diagram of the dual output stage.

It has been found to be particularly advantageous if the down converter and the up converter use a common storage choke L (FIG. 2). This results, on the one hand, in the advantage that only one storage choke need be included in the circuit and, on the other hand, in the transition between the two partial converters being improved.

As a further advantageous modification of the invention, the common storage choke L has two end taps and two center taps. In its closed state, the switch of the down converter T801 connects the end tap at the input side of the storage choke L by way of a first diode D801 with the input voltage potential. A second diode D802 connects the input of the storage choke with ground potential. If the switch of up converter T803 is closed, the center tap of the storage choke L on the output side is connected with ground potential. On the output side, the end tap of storage choke L is connected to ground by way of a third diode D803 and a filter capacitor C. At filter capacitor C, the output voltage with respect to ground is picked up. Another switch T802, when closed, connects the input side center tap of storage choke L with the input voltage $U_E$. With this measure, two known converter types which have completely different characteristics are linked into a switch controller system which has a considerably expanded control range and a smooth transition between the two partial converters by utilizing a common magnetic power component.

The switch of the down converter T801 is here actuated by the pulse width modulated control signal PWM of the pulse width modulator 500. The switch of the up converter T803 and the further switch T802 are actuated only if the input voltage $U_E$ lies in the lower range.

In a modification of the invention, a voltage detector 101 is provided which produces a voltage detection signal LVD as soon as the input voltage $U_E$ drops below a predetermined value. If this is the case, the pulse width modulated control signal is linked in a logic stage 300 with a clock signal to form the control signal VLV for the up converter. In the lower input voltage range, the further switch receives a control signal LVR which results from the linking of the pulse width modulated control signal and the voltage detection signal.

An advantageous feature of the invention employs switching transistors as switches for the two converters. These switching transistors receive the associated control signals PWM, LVR and VLV either directly at their base electrodes or the transistors are actuated by current sources which in turn are clocked by the respective control signals. The latter possibility has the advantage that a reliable operating state is ensured for a very broad input voltage range. To accelerate the turn-on duration of the actuated transistor, the constant current source is operated as an amplifier for a brief moment during turn-on and the constant current determining resistance in the emitter branch of the constant current source is bridged by a capacitor. This circuit arrangement significantly improves the switching behavior of the actuated switching transistor T801–T803.

To even further reduce the residual ripple of the output voltage, pulse width modulator 500, in order to produce the pulse width modulated signal PWM, compares a ramp function RG with a fixed frequency and a variable ramp edge with a fixed threshold value SW. This has the advantage that the minimum pulse width of the pulse width modulator, which is generally limited in that asymmetrically fed operational amplifiers at the inputs cannot be operated around zero, is reduced considerably.

The ramp generator 400 produces the ramp function RG at a fixed frequency with a ramp edge that varies as a function of the control deviation generated by the control amplifier. This is done, as an advantageous feature of the invention, by periodically discharging the capacitor C401 and subsequently recharging it by way of a controllable charging current source T601. For this purpose, the charging current source T601 is actuated by the control amplifier.

A further improvement of the control behavior is obtained if the variable ramp edge has a plurality of stages. In that way, fixed comparison points are given beforehand. Such a comparison point is very precise because the angle between the functions to be compared is 90°. The jitter of the pulse width modulator caused by an imprecise comparison point is reduced and thus the behavior of the entire control circuit is improved. Thus compensation circuits, which generally operate at the expense of the control dynamics, can be avoided.

The ramp edge is stepped, for example, by clocked actuation of the charging current source T601, but it may also be effected digitally. In one embodiment of the invention, control amplifier 600 has such dimensions that it performs self-sustained oscillations whose frequency is a multiple of the frequency of the ramp function RG and whose keying ratio is a function of the control deviation. The output of control amplifier 600 actuates discharging current source T601. Since thus the discharging current also flows in a keyed manner, a step function is superposed on the variable ramp edge. With this measure, the variable ramp edge can be stepped by simple means.

An embodiment of the storage choke as a flat coil in multi-layer technology has been found to be particularly advantageous for the switch controller system. This manner of construction leads to a reduction of the energy density in the storage choke. The low capacitances between the windings and the low stray inductances lead to a low tendency to self-sustained oscillations during the moments of switching.

It is particularly advantageous to adapt the width of the conductor paths and the number of windings of the different winding planes of the multi-layer technology storage choke L to the different current loads in the switch controller system. Winding planes experiencing high current loads have large conductor path widths and low numbers of windings, while winding planes experiencing low current loads have small conductor path widths and large numbers of windings.

In an advantageous modification of the switch controller system, the storage choke L has an annular core K. On the one side of the flat coil, the core extends perpendicular to the winding plane from the center to the edge and on the other side back through the center of the storage choke. The dimensions and shape of the core are then adapted to the storage choke and not, as is generally the custom, the shape of the choke to the core. Due to the proximity of the core to the windings of the flat coil, better energy coupling is realized.

The invention will now be described with reference to the figures and one embodiment thereof, in which:

DETAILED DESCRIPTION OF THE PREFERRED EMBODIMENTS

Figure 1:
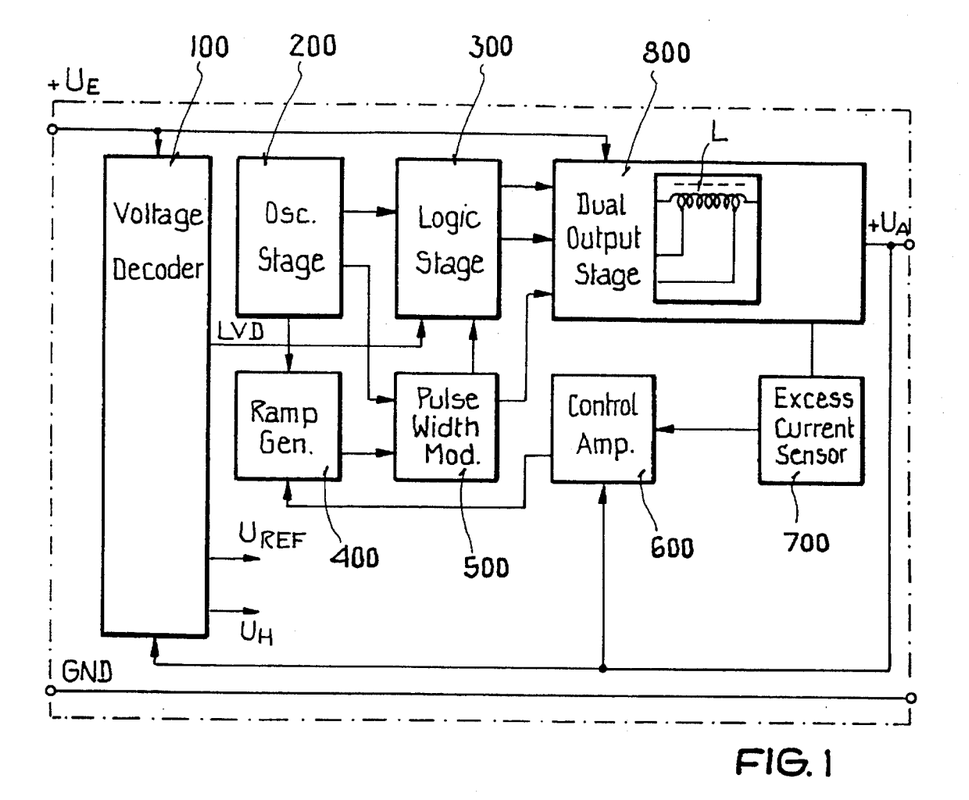
FIG. 1 is a block circuit diagram of the switch controller system according to the invention.

FIG. 1 depicts the structure of the switch controller system according to the invention as a block circuit diagram. A voltage decoder 100 receives the input voltage and the output voltage. At its outputs, the voltage decoder 100 furnishes, on the one hand, a constant reference voltage $U_{ref}$ which is generally lower than the lowest permissible input voltage, an auxiliary voltage $U_H$ which is employed for supplying voltage to the further circuit blocks and a voltage detection signal LVD which indicates whether the input voltage lies in a lower range.

An oscillator stage 200 furnishes the clock pulses for operating a pulse width modulator 500, a ramp generator 400 and a logic stage 300.

In addition to the clock signals, logic stage 300 receives the pulse width modulated output signal PWM of pulse width modulator 500 and the voltage detection signal LVD of the input voltage decoder. From these input signals, logic stage 300 generates two switching signals, LVR and VLV, which are fed to the dual output stage 800.

Dual output stage 800 is composed of a power output stage including switching converters, an inductance (L) for energy storage and an output filter for smoothing the output voltage $U_A$.

The feedback connection of the output voltage $U_A$ is effected by way of a control amplifier 600 whose output controls a ramp generator 400. In order to produce a pulse width modulated signal PWM, the variable ramp function RG of ramp generator 400 is compared with a fixed reference voltage. The output signal PWM of pulse width modulator 500 controls the power switches of dual output stage 800. The operation of the dual output stage will be described in greater detail below. An excess current sensor 700 which monitors the output current limits control amplifier 600 in such a manner beginning at a preselected output current $I_A$, that the switch controller system switches from a constant voltage regulation to a constant current regulation. The output current $I_A$ is limited to a maximum value as soon as the output current $I_A$ threatens to exceed this maximum value.

FIG. 2 shows the operational principle of the dual output stage 800. Storage choke L is disposed in the center of dual output stage 800 and, in addition to the two end taps, also has two center taps. A first switch T801 together with a second diode D802, storage choke L and a smoothing capacitor C, constitute a down or step-down converter. With a sufficiently high input voltage $U_E$, the control amplifier actuates only the switch of down converter T801 by way of the pulse width modulator 500.

A switch T803, together with the third diode D803, storage choke L and smoothing capacitor C, constitutes an up or buck-boost converter. The up converter produces its greatest power at a keying ratio of 50%. The switching signal VLV for the switch of up converter T803 is generated by logic circuit 300 from the clock signal and the pulse width modulated output signal of pulse width modulator 500. It drops each time after a half-period duration of each switching cycle so that the switch T803 is opened no later than at this time. The on-duration of the switch T803 of the up converter is determined by the linkage of the clock pulse signal with the output signal of the pulse width modulator. Since during the up conversion the kickback voltage is added to the input voltage, it is necessary to turn off the input voltage $U_E$ in a keyed manner in the transition region between the down conversion and the up conversion. This is done by a further switch T802 which, in the switched state, feeds the input voltage to a center tap of the storage choke. The further switch T802 is actuated by the pulse width modulated output signal of pulse width modulator 500. This signal is fed to the switch T802 only if the voltage detection signal LVD is simultaneously present at logic stage 300. Diode D801, which is disposed in the reverse direction between the storage choke and the switch of the up converter prevents the inverse operation of switch T801.

Figure 3:
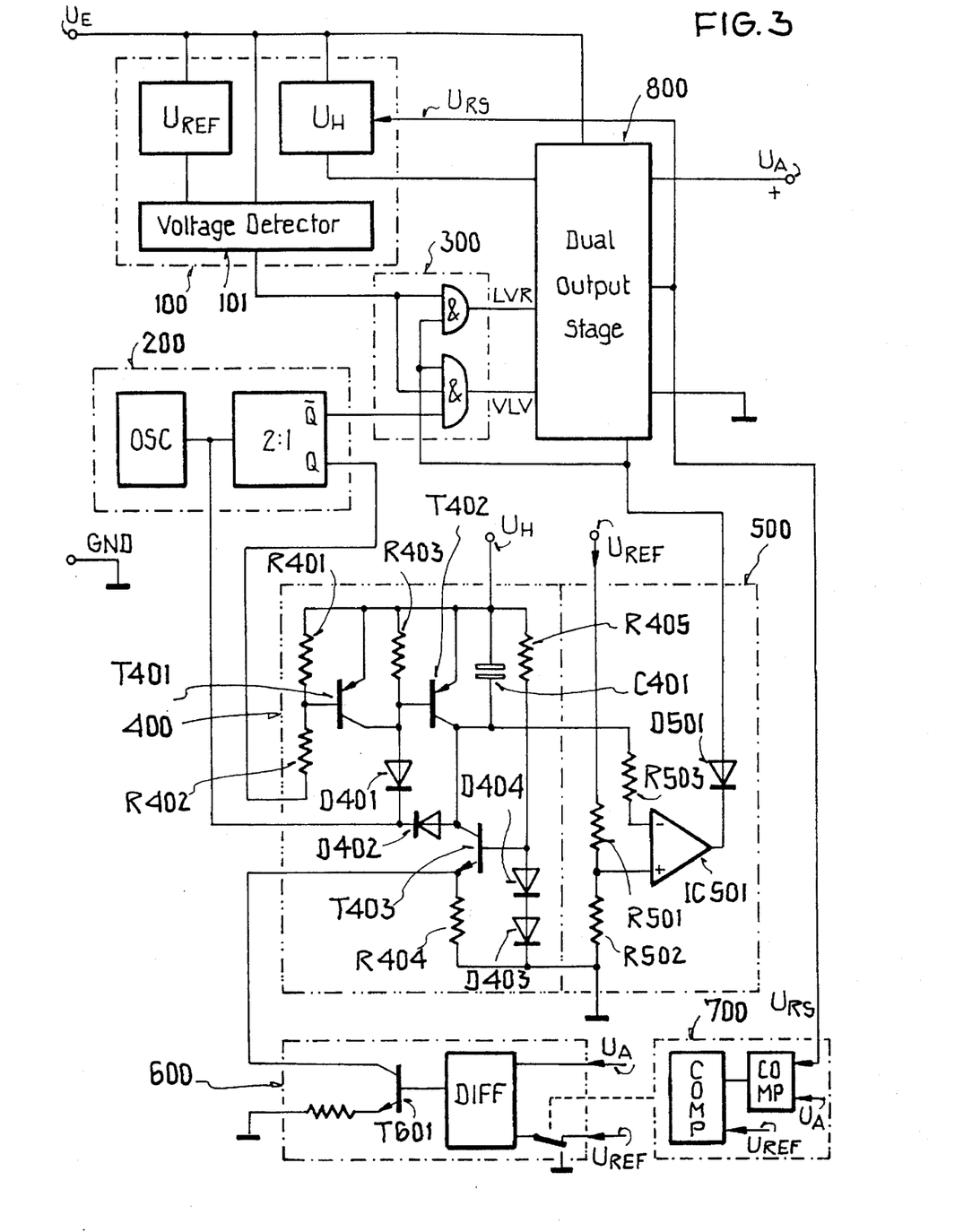
FIG. 3 depicts details of various circuit blocks of FIG. 1.
Figure 3A:
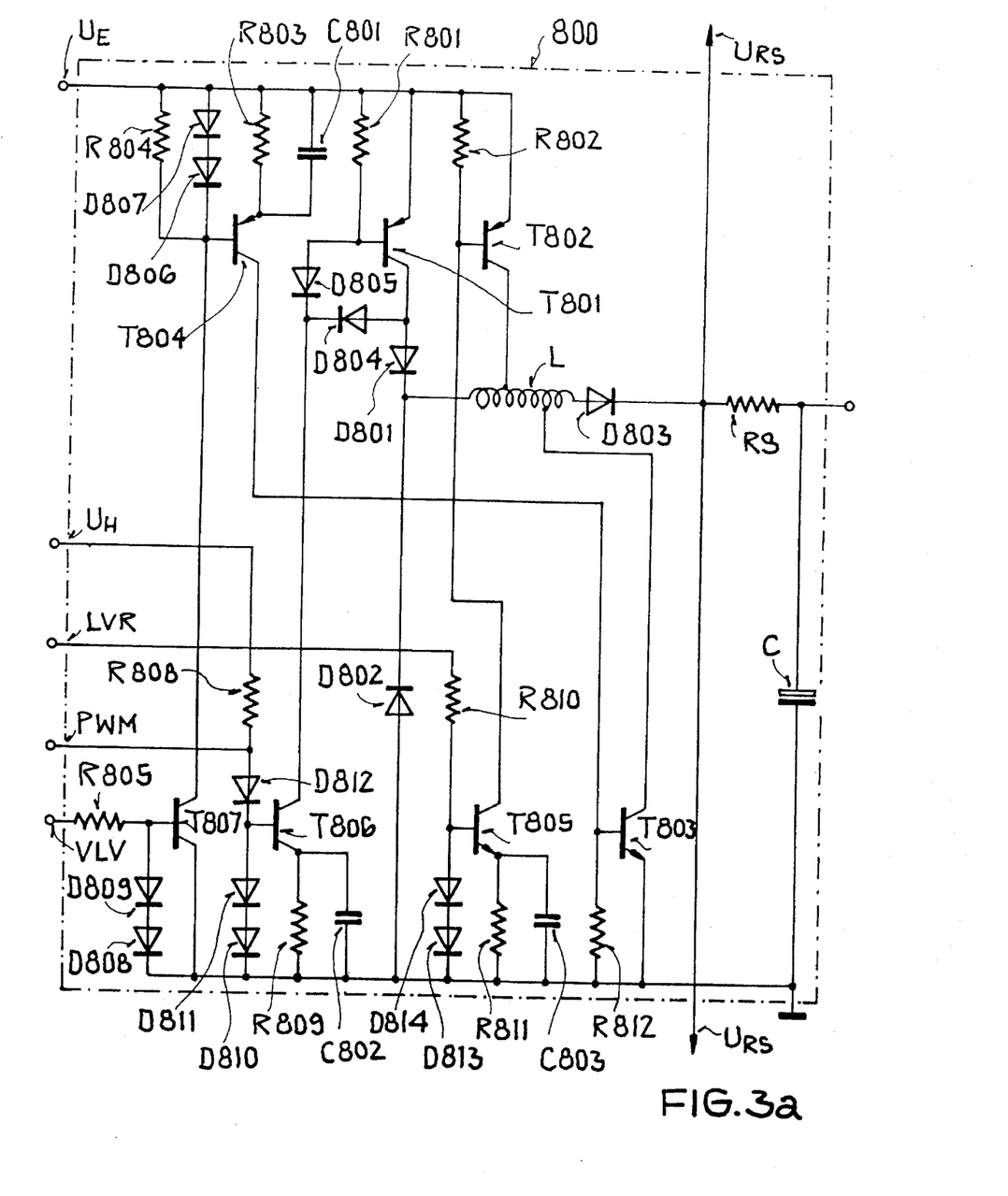
FIG. 3*a* depicts circuit details of an embodiment of the dual output stage.

FIG. 3 shows an embodiment of a switch controller system according to the invention. The voltage decoder 100, the oscillator stage 200 including an oscillator and a frequency divider, the control amplifier 600 and the excess current sensor 700 are shown here only as block circuit diagrams while the remaining circuit blocks are shown in detail. The details of the dual output stage 800 are shown in FIG. 3a. Input voltage decoder 100 forms the reference voltage $U_{REF}$ from input voltage $U_E$, which is less than the lowest permissible input voltage. Reference voltage $U_{REF}$ is used as the voltage reference in the other circuit blocks. The voltage detection signal LVD is formed in voltage detector 101 from the difference between input voltage $U_E$ and reference voltage $U_{ref}$ and indicates whether the input voltage lies in the lower voltage range. Depending on the magnitude of input voltage $U_E$, an auxiliary voltage $U_H$ is obtained either from input voltage $U_E$ or from output voltage $U_A$. This auxiliary voltage is lower than the output voltage $U_A$ and is employed essentially to supply the different circuit blocks in the switch controller system with voltage. In order to obtain a stable reference and auxiliary voltage in the required high input voltage range, for example a precision Zener diode is operated in each case by way of a respective constant current source.

Oscillator stage 200 includes an oscillator OSZ and a frequency divider stage, and is configured in such a way that the fundamental oscillation is made available at a first output of the stage 200, the frequency-halved fundamental oscillation is made available at a second output of the stage 200 Q, and the inverted frequency-halved fundamental oscillation is made available at a third output $\overline{Q}$.

Logic stage 300 is composed of two AND gates each having two or three inputs, respectively. In the first AND gate the voltage detection signal LVD of voltage decoder 101 is linked with the output signal of pulse width modulator 500 to form the switching signal LVR for the further switch T802. For the case that the input voltage $U_E$ lies in the lower voltage range, switch T802 is consequently switched analogously to the output signal of pulse width modulator 500. If the input voltage lies above this range, the further switch T802 remains open.

Figure 4:
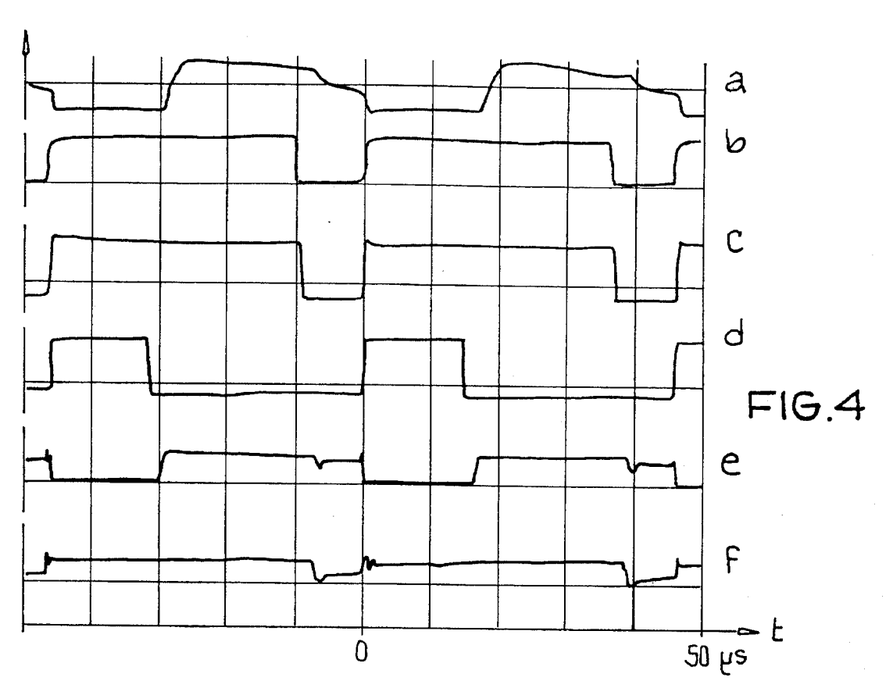
FIGS. 4 and 5 depict the signal curves of the current through the storage choke and the curves of the switching signals.
Figure 5:
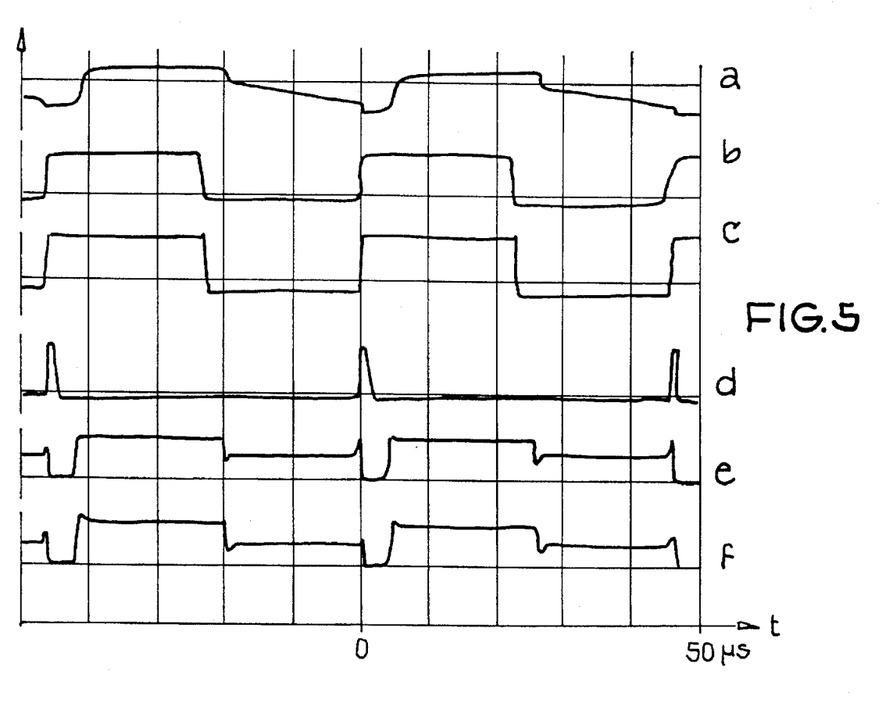

In the second AND gate, the voltage detection signal LVD is linked with the output signal of the pulse width modulator 500 and additionally with the inverted frequency-halved fundamental oscillation Q of the oscillator stage to form the switching signal VLV for the switch of up converter T803. If the input voltage $U_E$ lies in the lower voltage range, the switch of up converter T803 is switched analogously to the output signal of pulse width modulator 500 only during the first half of the period duration of the switching frequency. During the second half of the period of the switching frequency, the switch of the up converter remains open so that the energy stored in the storage choke can be given to filter capacitor C. If the input voltage $U_E$ lies above the lower voltage range, which is indicated by the absence of a voltage detection signal LVD, the switch of the up converter remains open as well and the switch controller system operates as a simple down converter. The corresponding pulse diagrams are shown in FIGS. 4 and 5. In this connection, the respective diagrams depict the following: (a) the current through the storage choke; (b) the output signal PWM of pulse width modulator 500; (c) the switching signal LVR for further switch T802; (d) the switching signal VLV for the switch T803 of the up converter; (e) the voltage curve at the connection point of the further switch T802 to the storage choke; and (f) the voltage at the connection point of the switch of the up converter T803 with the storage choke. In both of FIGS. 4 and 5, the input voltage $U_E$ lies in the respective lower voltage range. In the diagrams of FIG. 4, input voltage $U_E$ is lower than in FIG. 5 which is also illustrated by the width of switching signal VLV for the switch of the up converter. This pulse is smaller in FIG. 5d than in FIG. 4d.

The output stage of the switch controller system has three switching states which are a function of the input voltage $U_E$ and smoothly change from one to the other. The switching between the switching states is effected as a function of input voltage $U_E$ essentially by logic stage 300.

With a minimum input voltage $U_E$, only the third switch T803 operates in the keyed mode since the pulse width modulator puts out the maximum pulse width. Logic stage 300 takes care that the up converter L, T803, D803 operates with the greatest energy transfer. When the third switch T803 opens, the energy stored in the inductance is stocked up to the input voltage $U_E$. If the input voltage increases somewhat, the second switch T802 interrupts the stocking up if the change in the keying ratio is insufficient to regulate the switch controller system. In this operating domain, the first diode D801 prevents the inverse operation of the first switch T801. If the input voltage $U_E$ lies above the lower voltage range, the second switch T802 and the third switch T803 remain blocked due to the absence of the voltage detection signal while the first switch T801 is actuated with a variable keying ratio. In this operating domain, only the down converter T801, D802, L is in operation.

Together with pulse width modulator 500, ramp generator 400 constitutes an important function block in the switch controller system according to FIG. 3. While conventional pulse width modulators compare a variable threshold value with a defined ramp of a sawtooth generator, in the switch controller system presented here a ramp function RG with a fixed frequency and a variable edge is compared with a defined reference voltage. Since operational amplifiers which are asymmetrically fed as comparators cannot be operated around the zero point at the two inputs, the problem arises in connection with the prior art pulse width modulators that the variable threshold must not go toward zero and thus the minimum pulse width of the pulse width modulator is restricted considerably. If, however, a variable edge of the ramp function RG is compared with a fixed threshold, the minimum and maximum pulse width, respectively, of the output signal of pulse width modulator 500 are a function only of the minimum or maximum rise, respectively, of the ramp edge.

Figure 6:
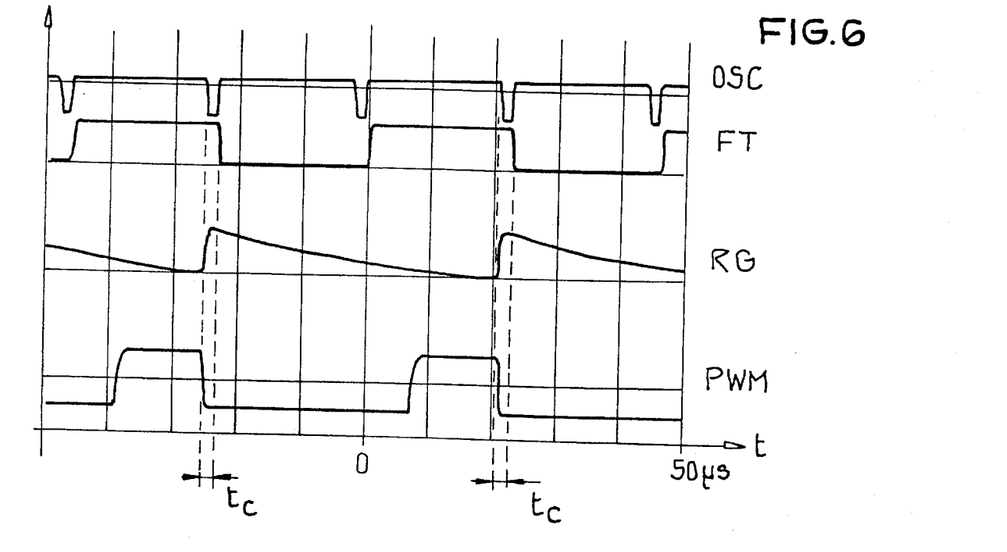
FIG. 6 is a diagram showing the signal timing.

To generate the ramp function RG with a fixed frequency and a variable ramp edge, ramp generator 400 is fed the fundamental frequency and the frequency-halved fundamental frequency of oscillator stage 200. The two signal curves are shown in the pulse diagrams OSZ and FT of FIG. 6. If, for the time duration TC, the pulse of the fundamental oscillator frequency OSZ overlaps the halved fundamental frequency FT of the frequency divider, capacitor C401 is discharged by way of transistor T402 during the time TC. This process occurs periodically with the frequency of the halved fundamental oscillation and marks the almost perpendicularly rising fixed edge of ramp function RG. During the remaining time of the period duration, capacitor C401 is charged by way of a further transistor T403 and a controllable current source T601 of the control amplifier. At the point where capacitor C401 is connected with current source T601, this produces the ramp voltage RG with a fixed frequency and a variable ramp edge as shown in FIG. 6. The steepness of the ramp edge can be set by way of the charging current generated by the controllable current source T601. The flattest rise results in the embodiment of FIG. 3 from the magnitude of resistor R404 which connects the emitter of transistor T403 with ground. On the other side, the maximum steepness of the ramp edge is limited by the magnitude of the emitter resistance R614 of the controllable loading current source T601.

In the present embodiment according to FIG. 3, the pulse width modulator 500 is essentially composed of an operational amplifier IC501 that is connected to operate as a comparator and compares the ramp function, which has a fixed frequency and a variable ramp edge, with a firmly defined voltage reference. If the ramp voltage drops below the voltage reference, the output voltage of operational amplifier IC501 rises suddenly. If the ramp function rises again due to discharging of capacitor C401, the voltage pulse at the output of operational amplifier IC501 is terminated.

Figure 7:
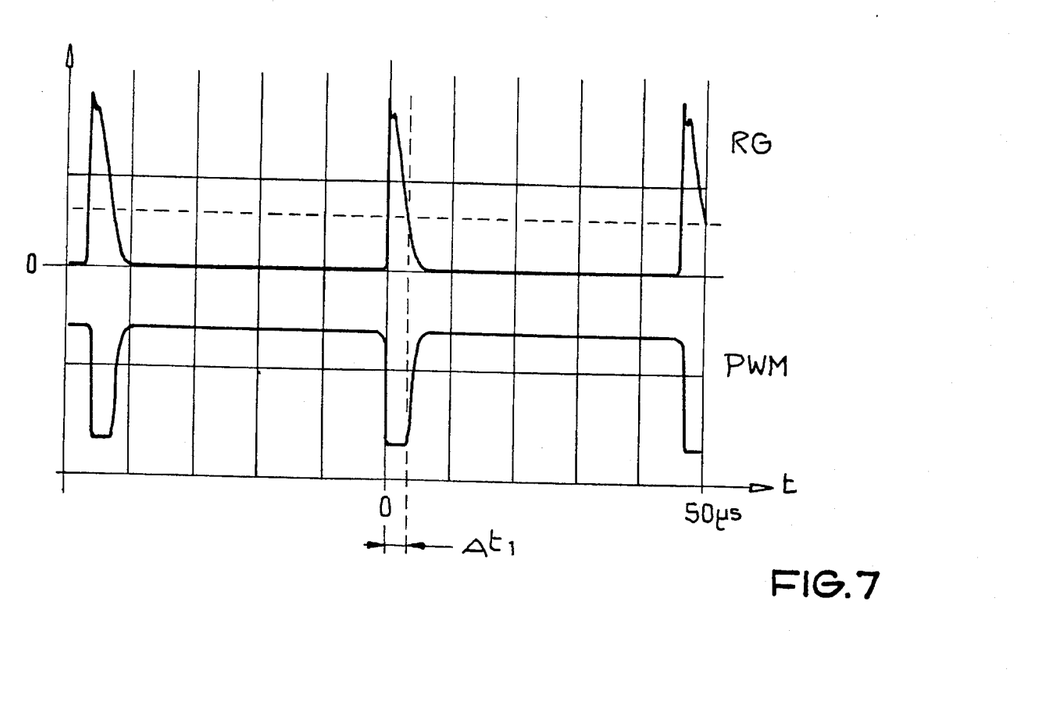
FIGS. 7, 8 and 9 depict the pulse width modulated signal PWM as a function of the ramp function.
Figure 8:
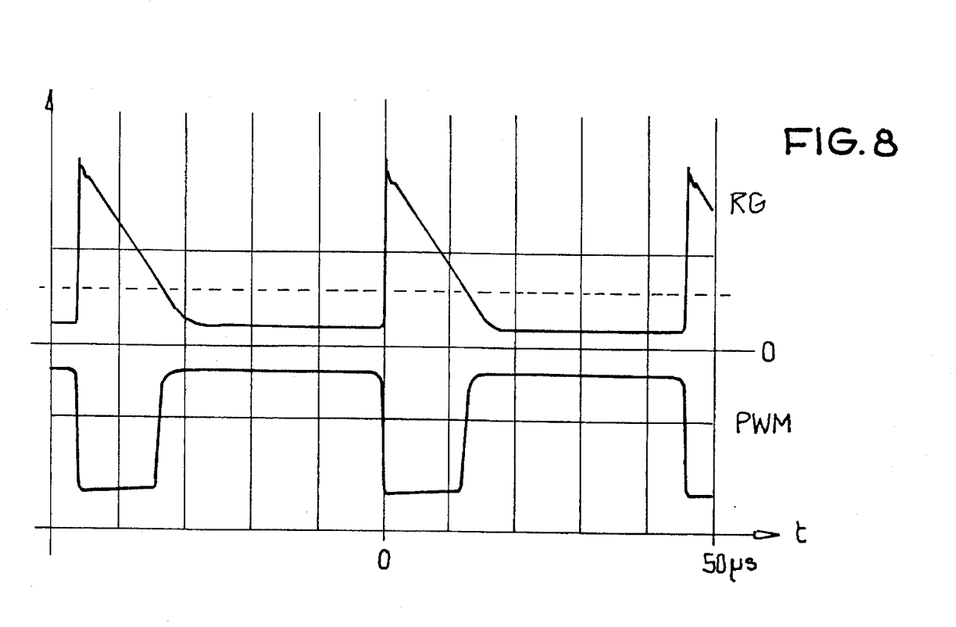
Figure 9:
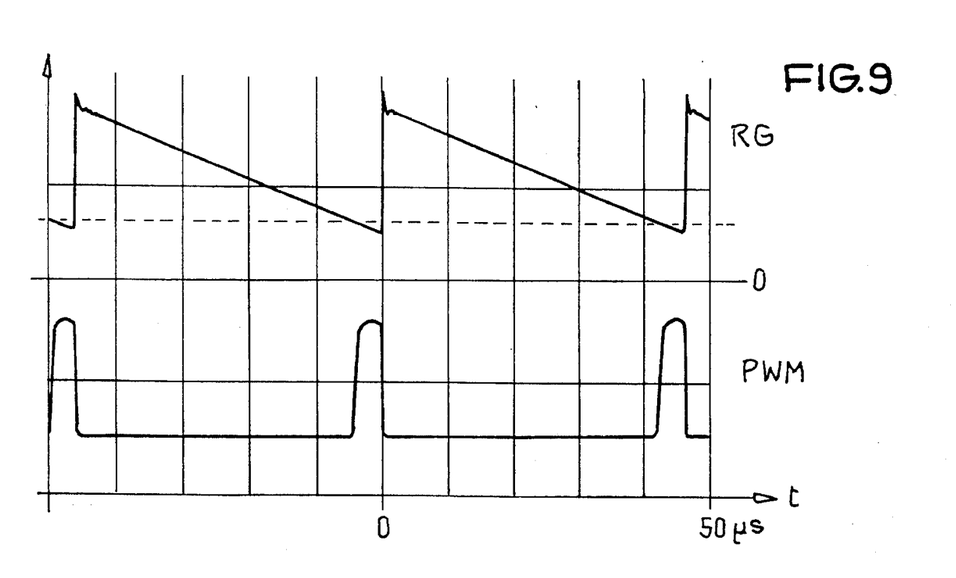

FIG. 6 shows the output signal PWM of pulse width modulator 500 together with the ramp function RG and clock pulse signals FT and OSZ of the oscillator stage. FIGS. 7, 8 and 9 show output pulses of various widths from pulse width modulator 500 as a function of the ramp function RG with a fixed reference voltage. The reference voltage is shown in the figures as a dashed horizontal line. It is evident that the maximum pulse width is dependent upon the minimum charging and discharging time of capacitor C401, while the minimum pulse width may also go toward zero. In that case, capacitor C401 is no longer charged within the period duration of the ramp function to the extent that the voltage is lower than the reference voltage.

FIG. 3a depicts an embodiment of the dual output stage 800 whose basic configuration has already been discussed in connection with FIG. 2. The operation of switches T801–T803 is here taken over by the corresponding transistors T801–T803. The first transistor T801 receives the input voltage $U_E$ at its emitter. The collector is connected, by means of a first diode that is connected in the forward direction, with the input side end tap of the storage choke. The second diode D802 in the reverse direction connects the input side end tap of storage choke L with the ground contact. The base of transistor T801 is connected with the first constant current source formed by transistor T806. Transistor T806 is clocked by the output signal of pulse width modulator 500 so that the transistor T801 operating as a switch of the down controller is also clocked by the pulse width modulated signal PWM. Transistor T801 together with the second diode D802 and storage choke L constitutes the part of the output stage that operates as a pure down or step-down converter if the input voltage is sufficiently high. Then the two AND gates of logic stage 300 are blocked due to the absence of the voltage detection signal and no switching signal reaches the other two switches of the dual output stage T802, T803.

The emitter terminal of the third transistor T803 is connected with ground potential. Its collector is connected with the output side center tap of storage choke L. Together with the third diode D803, which in the forward direction connects the output side end tap of the storage choke with filter capacitor C, this arrangement, taken by itself, constitutes an up or buck-boost converter. The third switching transistor T803 is actuated by way of two further clocked current sources with turn-on override T804, T807 by the switching signal VLV of the second AND gate of logic stage 300. Since half the fundamental frequency is present at one input of the second AND gate, it is ensured that the third switching transistor is clocked at a maximum switching rate of 50% of the period duration. With this keying ratio, the up converter produces its greatest power. Since the second AND gate receives, at a further input, the voltage detection signal LVD of voltage decoder 101, the up converter operates only if the input voltage lies in the lower voltage range. In the transition range which lies between the operating mode as a pure up converter with a keying ratio of 50% and the operating mode as a pure down converter, it is necessary to turn off input voltage $U_E$ in a keyed manner and to keep the output voltage $U_A$ constant.

This is accomplished by the second switching transistor T802, whose emitter terminal is connected with input voltage $U_E$. Its collector is connected with the input side center tap of storage choke L. The second switching transistor T802 is actuated by way of a further clocked current source T805 by the switching signal LVR of the first AND gate of logic stage 300. Since the first AND gate of logic stage 300 links the voltage detection signal LVD of voltage detector 101 with the output signal PWM of pulse width modulator 500, the second switch is switched, in the lower range of input voltage $U_E$, with the signal of pulse width modulator PWM. The result is that the maximum keying ratio of 50% of the up converter is reduced by the turn-off time of pulse width modulator 500 and simultaneously the input voltage $U_E$ is turned off from storage choke L. The diode between the first switching transistor T801 and the input side end tap of storage choke L prevents the inverse operation of the first switching transistor T801 during up converter operation.

Due to the fact that switching transistors T801–T803 are actuated by way of clocked current sources with turn-on override, reliable switching of the switching transistors is ensured over the broad input voltage range. For this purpose, the emitter of the current source transistor is connected with a parallel connection of a resistor and a capacitor with the input voltage and with ground potential, respectively. The current determining emitter resistor is ineffective until the parallel connected capacitor is charged. The circuit initially operates as an amplifier and thereafter changes to constant current operation. Such clocked current sources with turn-on override are provided repeatedly in the circuit according to FIG. 3a and accelerate the switching behavior of the thus actuated switching transistors T801–T803.

The voltage obtained at the end tap on the output side of storage choke L is smoothed by filter capacitor C toward the output voltage $U_A$. The output voltage $U_A$ is fed to a control amplifier 600 and is there compared with a voltage reference. The control amplifier controls the charging current of ramp generator 400 by way of a controllable charging current source T601 and thus, by way of the steepness of the variable ramp edge, it controls the keying ratio of the pulse width modulator.

A current sensor resistor RS is also disposed in the output branch of dual output stage 800. The voltage $U_{RS}$ present at the first end of resistor RS is compared by excess current sensor 700 with the output voltage $U_A$ at the other end of the resistor. The difference between the two voltages is a measure for the magnitude of the output current $I_A$ of the switch controller system and is compared with a voltage reference. If the output current $I_A$ exceeds a maximum permissible value, excess current sensor 700 limits the voltage reference of control amplifier 600. In this way, at a maximum output current $I_{Amax}$, the switch controller system changes from a constant voltage control behavior to a constant current control behavior. Thus the switch controller system is made resistant to short circuits.

Figure 10:
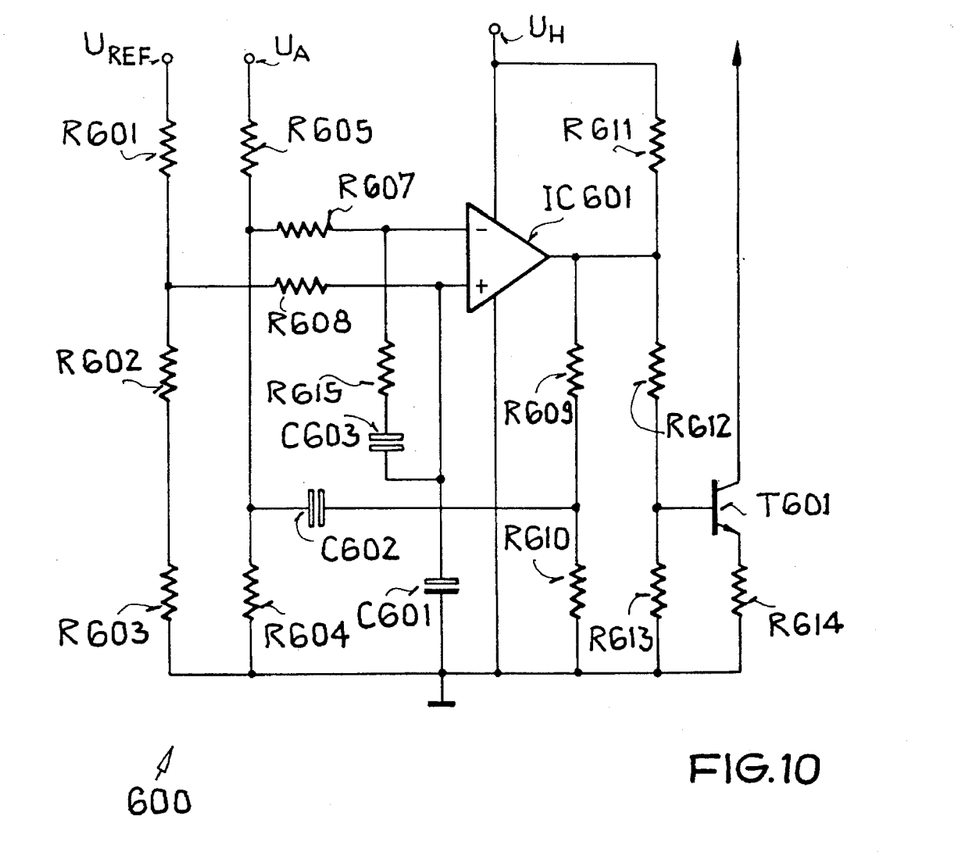
FIG. 10 depicts circuit details of the control amplifier.
Figure 11:
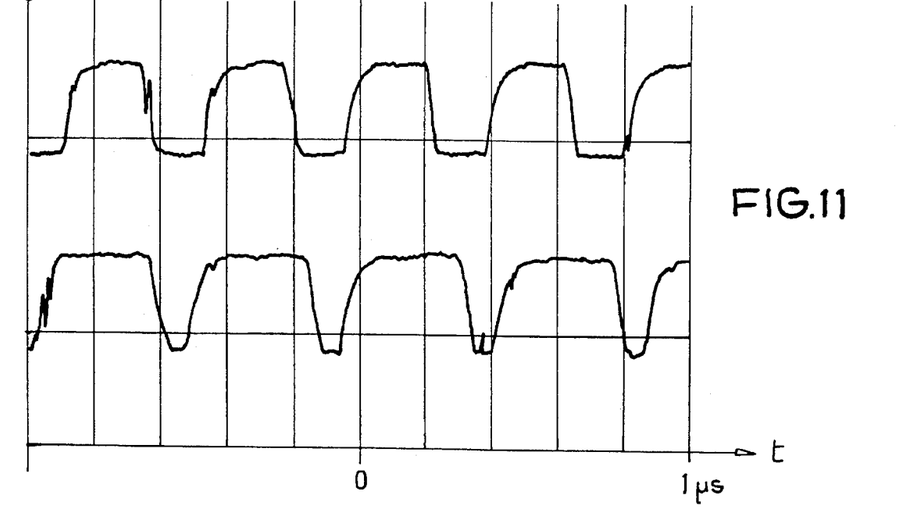
FIG. 11 is a diagram of the charging current of the ramp generator.

FIG. 10 depicts a particularly advantageous embodiment of control amplifier 600. By way of charging current source T601, control amplifier 600 controls the charging current of the edge determining capacitor C401 of ramp generator 400. In order to realize an accurate comparison result between the variable ramp function and the fixed threshold value, it is advantageous to provide the ramp edge with a plurality of steps. The generation of the steps in the variable ramp edge may be effected, for example, by digital means. In the present embodiment, the ramp is stepped by means of a pulsed actuation of charging current source T601. FIG. 11 shows the current through charging current source T601 as a function of time for two different control deviations. The control amplifier 600 of FIG. 10 is designed in such a way that differential amplifier IC601 performs self-sustained oscillations whose frequency corresponds to a multiple of the ramp frequency.

Figure 12:
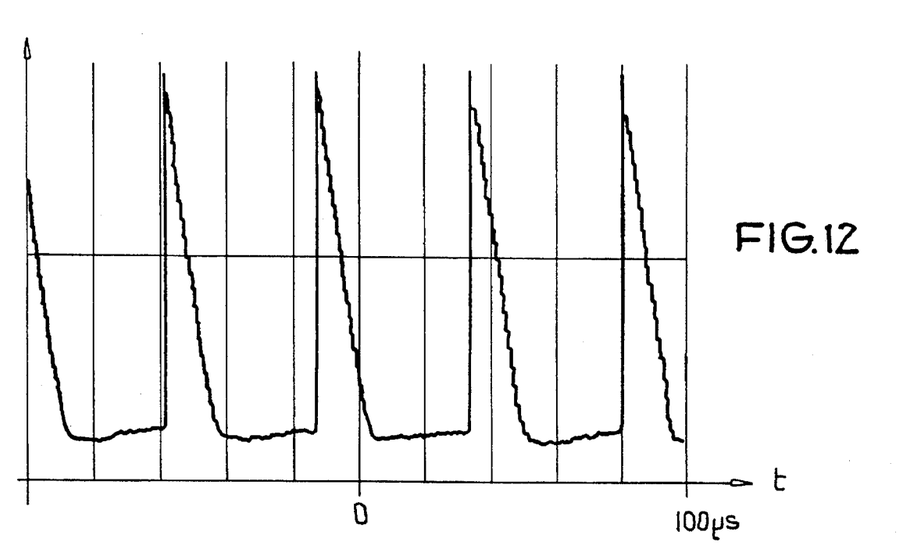
FIG. 12 is a diagram of the stepped ramp function.

FIG. 12 shows the steps on the ramp function RG as they result from the pulsed charging current. The differences in the time axes of FIGS. 11 and 12 should be noted. The stepped ramp edge improves the comparison with the voltage reference and thus prevents jitter in the pulse width modulator.

Figure 13:
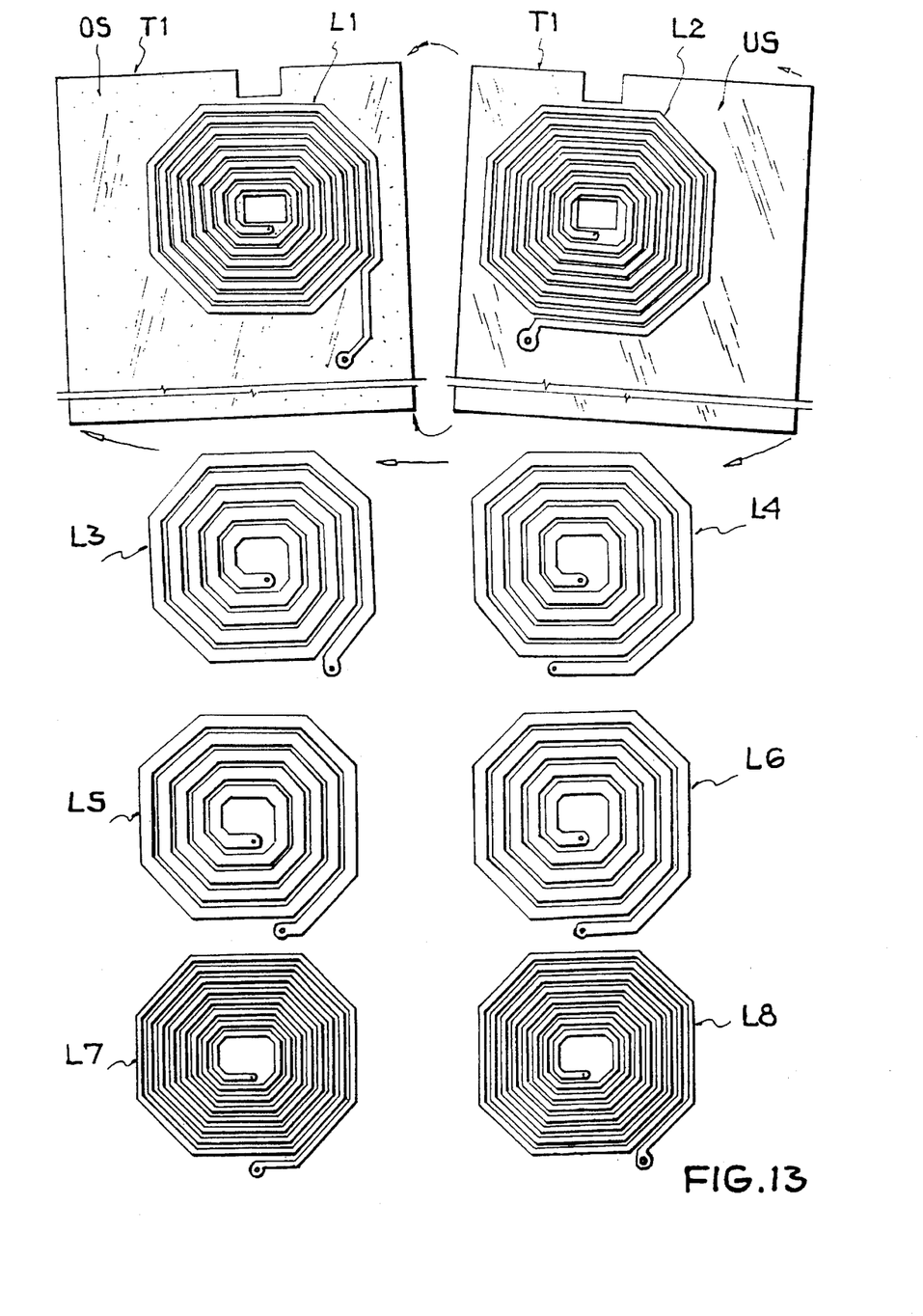
FIG. 13 depicts the layout of the multi-layer storage choke.
Figure 14:
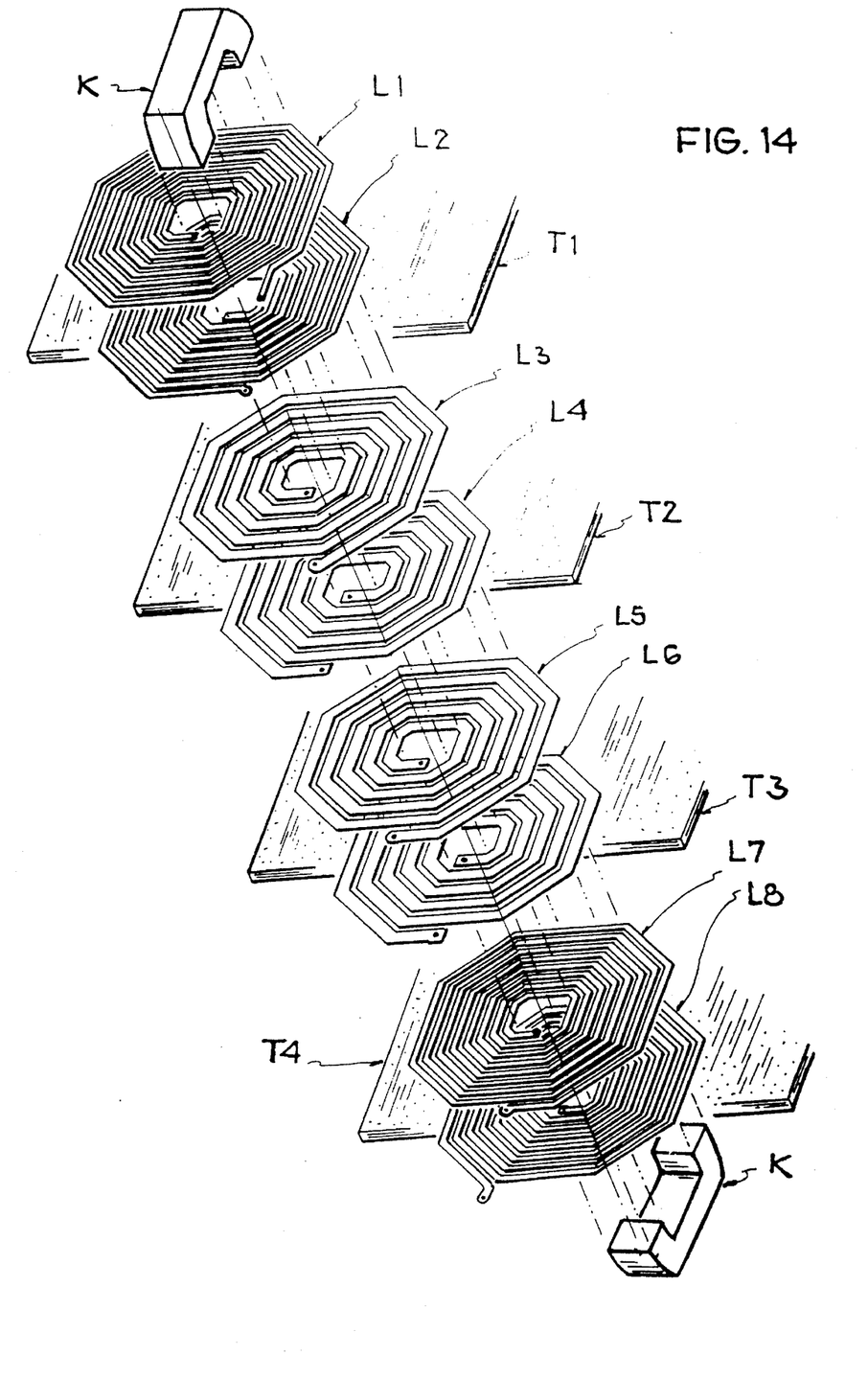
FIG. 14 is a perspective view of the storage choke of FIG. 13.

FIG. 13 shows an embodiment of the storage choke L of the switch controller system in an embodiment as a flat coil in multi-layer construction. The respectively facing coil pairs L1–L2, L3–L4, L5–L6, L7–L8 each constitute the top face OS and the bottom face US of a metal flat coil applied to a substrate material T1–T4. The pairs are joined and connected with one another in the center of the winding so that coil pairs are created which extend on the one side of the substrate material from the outside toward the inside and on the other side of the substrate layer from the inside toward the outside without the winding direction changing. The individual coil pairs are packed on top of one another with an insulating layer between each pair and are connected at the outer end points of the winding with the beginning of the subsequent coil pair. At these connecting points the center taps of the storage choke are also brought out. A particular advantage of this arrangement is that, depending on the current load on the partial coils of storage choke L from the individual switches of the switch controller system, the width of the conductor paths and the number of windings can be varied. In the present embodiment, the two center coil pairs L3–L4, L5–L6, which each carry the high current load in up converter operation of the controller system are provided with correspondingly broad conductor paths. The widths of the conductor paths of the two outer coil pairs L1–L2, L7–L8 which are subjected to a significantly lower current load, are smaller than those of the two inner coil pairs L3–L4, L5–L6. At the same time, the number of windings are greater. The thus constructed storage choke L further has an annular core K which encloses the storage choke L from the center of the windings toward the edge in a direction perpendicular to the winding plane (two "U-shaped cores"). The core dimensions and the shape of the core are adapted to the flat coil. Core K is adapted to the windings and not the windings to the core. FIG. 14 shows the storage choke in a perspective view. The storage choke in multi-layer construction has the following advantages over conventional storage chokes: a reduction of the energy density, low capacitances between the windings, low stray inductances, low tendency to self-sustained oscillations during the moments of switching with simultaneous reduction of the core size and a simplified manufacturing process.

The combination of the improvements described here results in a novel switch controller system which links two known converter concepts having completely different characteristics to form a novel controller system. This novel switch controller system has a significantly expanded control range with a smooth transition between the partial converters. At the same time, a common storage choke is utilized jointly by both converter types.

We claim:

1. A switch controller system for converting an input voltage ($U_E$) into an output voltage ($U_A$), said system including a control amplifier and a pulse width modulator disposed in a control loop as well as a power output stage, with said power output stage including a storage choke (L) as the control path, a down converter and an up converter so that an input voltage range from a lower range $U_E<U_A$ to an upper range $U_E>U_A$ can be fully regulated by the switch controller system; and wherein: the storage choke (L) is utilized in common by the down converter and by the up converter and is provided with two end taps and two center taps; the switch of the down converter, when closed, connects the input voltage ($U_E$) by way of a first diode connected in the forward direction with the input side end tap of the storage choke (L) and by way of a second diode connected in the blocking direction with ground potential (GND); the switch of the up converter, when closed, connects the output side center tap of the storage choke (L) with ground potential (GND); the output side end tap of the storage choke (L) is connected by way of a third diode with a filter capacitor at which the output voltage ($U_A$) is picked up; and a further switch is provided which, when closed, connects the input side center tap of the storage choke (L) with the input voltage ($U_E$).

2. The switch controller system according to claim 1, wherein the switch of the down converter is actuated by the pulse width modulated control signal (PWM) of the pulse width modulator.

3. The switch controller system according to claim 2 wherein a voltage detector is provided which generates a voltage detection signal (LVD) to indicate whether the input voltage ($U_E$) lies in the lower range.

4. The switch controller system according to claim 3, wherein that a logic stage (300) is provided which links the voltage detection signal (LVD) with the pulse width modulated control signal (PWM) and with a clock signal to form a second control signal (VLV) which actuates the switch of the up converter.

5. The switch controller system according to claim 4, wherein the logic stage continues to link the voltage detection signal (LVD) with the pulse width modulated control signal (PWM) to form a third control signal (LVR) which actuates the further switch.

6. The switch controller system according to claim 1, wherein the switch of the up converter (T803) and the further switch are actuated only if the input voltage lies in the lower range.

7. The switch controller system according to claim 1 wherein the switches of the down converter and of the up converter and the further switch are respective switching transistors.

8. The switch controller system according to claim 7, wherein the associated control signals (PWM, LVR, VLV) are fed to the base electrodes of the respective switching transistors.

9. The switch controller system according to claim 7, wherein the switching transistors are actuated by clocked current sources which in turn are clocked by respective ones of said control signals (PWM, LVR, VLV).

10. The switch controller system according to claim 9, wherein the clocked current sources are each composed of a current source transistor having a parallel connection of a current determining resistor and a capacitor in their emitter path so that the respective current source transistor overshoots at the moment of turn-on and briefly operates as amplifier.

11. The switch controller system according to claim 1 wherein a pulse width modulated signal (PWM) is generated in the pulse width modulator whenever a ramp function (RG) with a fixed frequency and a variable ramp edge drops to below a fixedly set threshold value (SW).

12. The switch controller system according to claim 11, wherein a ramp generator is provided which produces the ramp function (RG) with a fixed frequency and a variable ramp edge in dependence of the control amplifier.

13. The switch controller system according to claim 12, wherein the ramp function (RG) is effected by periodically discharging a capacitor and subsequent recharging by way of a controllable charging current source.

14. The switch controller system according to claim 13, wherein the actuation of the charging current source is effected by the control amplifier.

15. The switch controller system according to claim 13 wherein the descending edge of the ramp function (RG) has steps.

16. The switch controller system according to claim 15, wherein the steps of the ramp edge are produced by a clocked actuation of the charging current source (T601).

17. The switch controller system according to claim 16, wherein the control amplifier (600) has such dimensions that it performs self-sustained oscillations whose frequency is a multiple of the frequency of the ramp function (RG) and whose keying ratio is a function of the control deviation.

18. The switch controller system according to claim 1, wherein the storage choke (L) is configured as a flat coil in multi-layer technology.

19. The switch controller system according to claim 18, wherein the width of the conductor paths and the number of windings of the various winding planes of the storage choke (L) are adapted to the different current loads in the switch controller system.

20. The switch controller system according to claim 18, wherein the winding planes of the storage choke (L) that are subjected to high current loads have large conductor path widths and small numbers of windings.

21. The switch controller system according to claim 18, wherein the winding planes of the storage choke (L) that are subjected to low current loads have small conductor path widths and large numbers of windings.

22. A switch controller system according to claim 18, wherein the storage choke (L) has a core.

23. The switch controller system according to claim 22, wherein the core of the storage choke (L) has an annular configuration and extends perpendicularly to the winding plane from the center toward the edge.

24. The switch controller system according to claim 22 wherein the core of the storage choke is adapted in dimensions and shape to the storage choke.

* * * * *